United States Patent
Gerlings et al.

(10) Patent No.: US 6,590,838 B1
(45) Date of Patent: Jul. 8, 2003

(54) PLAYBACK APPARATUS FOR RECORDING MEDIA

(75) Inventors: Karl-Heinz Gerlings, Salzgitter (DE); Dirk Strauss, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,634

(22) PCT Filed: Oct. 1, 1997

(86) PCT No.: PCT/DE97/02259
§ 371 (c)(1),
(2), (4) Date: Aug. 20, 1999

(87) PCT Pub. No.: WO98/26417
PCT Pub. Date: Jun. 18, 1998

(30) Foreign Application Priority Data

Dec. 11, 1996 (DE) .......................... 196 51 4118

(51) Int. Cl.⁷ .............................. G11B 17/22
(52) U.S. Cl. ................ 369/30.06; 369/30.08; 707/104.1
(58) Field of Search ............... 369/30.06, 30.09, 369/30.08, 30.26, 30.64, 32.01, 30.05, 47.1; 707/104.1, 102; 428/64.4; 340/5.9, 825.25; 711/112

(56) References Cited

U.S. PATENT DOCUMENTS

| 5,644,558 A | 7/1997 | Inatani et al. | |
|---|---|---|---|
| 5,691,964 A | * 11/1997 | Niederlein et al. | 369/30 |
| 6,011,758 A | * 1/2000 | Dockes et al. | 369/30 |
| 6,226,235 B1 | * 5/2001 | Wehmeyer | 369/30 |
| 6,388,958 B1 | * 5/2002 | Yankowski | 369/30.06 |

FOREIGN PATENT DOCUMENTS

| BE | 886 928 A | 4/1981 |
|---|---|---|
| DE | 41 21 698 | 12/1992 |
| EP | 0 600 438 | 6/1994 |
| EP | 0 703 579 | 3/1996 |
| JP | 04 245085 | 9/1992 |
| JP | 07 244968 | 9/1995 |
| WO | 92 07360 | 4/1992 |
| WO | 92 22063 | 12/1992 |
| WO | 94 17526 | 8/1994 |

\* cited by examiner

*Primary Examiner*—Ali Neyzari
(74) *Attorney, Agent, or Firm*—Kenyon & Kenyon

(57) ABSTRACT

A playback apparatus for a recording medium, in particular a compact disc player, a compact disc changer, a cassette or tape player, which permits naming of the recording medium is described. The playback apparatus includes a display device and an input unit. In addition, a memory unit in which the name of the recording media can be stored is provided. In addition, a memory access unit by means of which the contents of the memory unit can be read out directly and displayed on the display device is provided. The memory unit is designed as a read-write memory. The contents of the memory unit displayed on the display device can be revised and stored or deleted by using the input unit.

14 Claims, 3 Drawing Sheets

PLAYBACK APPARATUS FOR RECORDING MEDIA

FIELD OF THE INVENTION

The present invention relates to a playback apparatus.

BACKGROUND INFORMATION

The Berlin RCM303-A car radio equipped with a 10-disc CD changer is described in from the Blaupunkt catalog "Mobile Audio Systeme '95/'96" (Mobile Audio Systems '95/'96). This car radio is equipped with a disc naming function with which any desired name can be assigned to a compact disc being played at that moment. This name will then appear in the display each time that compact disc is played.

SUMMARY

The playback apparatus according to the present invention, has the advantage that names of recording media that are not being played at that moment and that have not even been placed in the playback apparatus once can in this way also be displayed on the display device. This yields greater convenience and straightforward operation while also simplifying operation, because each memory location entry can be observed at any time.

It is especially advantageous that contents from the memory unit displayed on the display device can be revised for storage or deleted by using the input unit. In this way it is possible to revise or delete entries to the memory without the recording medium having to be present in the playback apparatus. This greatly simplifies operation of the playback apparatus and saves time because the corresponding recording medium need not be inserted into the playback apparatus to revise the contents of the memory.

It is also advantageous that the type of display of a name on the display device is based on the storage and/or the status of a recording medium assigned to that name in the playback apparatus. In this way the user's information can be improved in a simple and straightforward manner.

It is also advantageous that the memory access unit includes at least one operating element on the input unit, and that by operating the minimum of one operating element, a selection of a memory location of the memory unit can be implemented. This makes it especially simple and straightforward for the user to select a memory location and furthermore it requires very little time.

DETAILED DESCRIPTION

Figure 1:
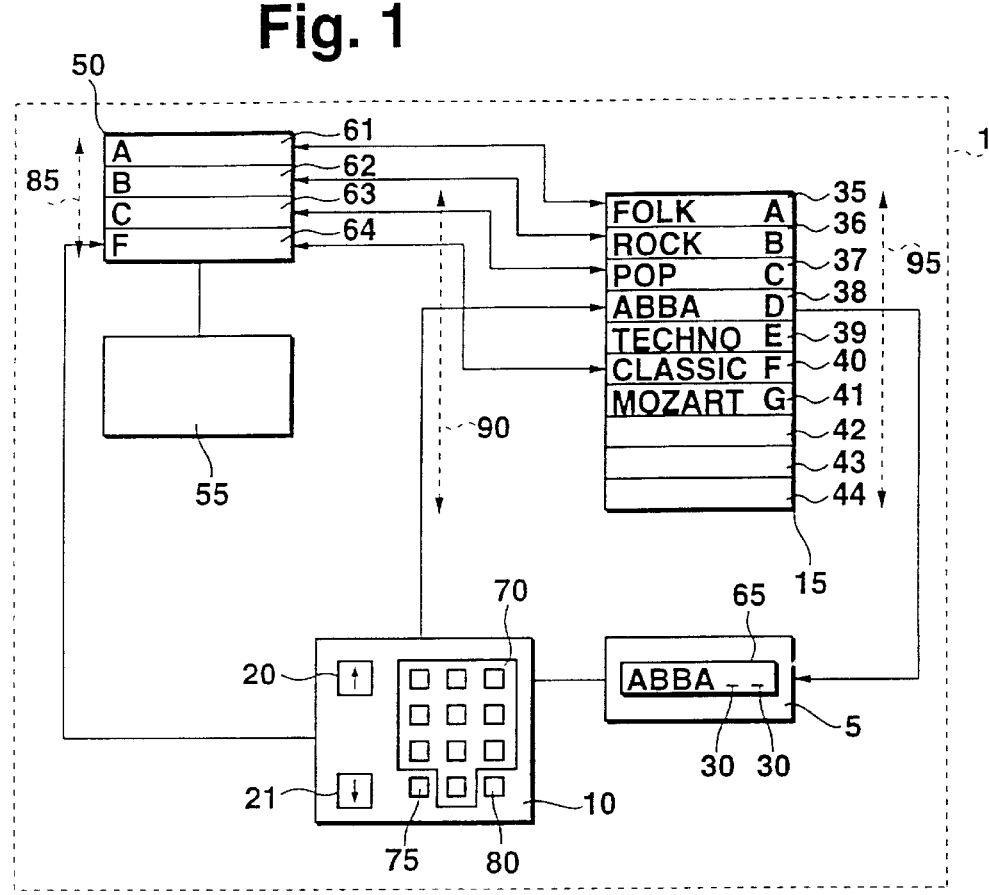
FIG. 1 shows a block diagram of a playback apparatus according to an example embodiment of the present invention.

FIG. 1 shows a playback apparatus 1 designed as a compact disc changer with a compact disc drive 55 which is provided on a magazine 50 having four magazine positions 61, 62, 63, 64, so that magazine 50 holds four compact discs. Magazine 50 is also connected to an input unit 10 which includes an alphanumeric 10-key keypad 70, a delete key 75, a save key 80, a first operating element 20 and a second operating element 21. Input unit 10 is also connected to a display device 5 having a display 65. Compact disc changer 1 also has a memory unit 15 with ten memory locations 35–44. Memory unit 15 is designed as a read-write memory and is connected to input unit 10 and display device 5. Memory unit 15 is also connected to magazine 50. A first compact disc A is placed in first magazine position 61, a second compact disc B is placed in second magazine position 62, a third compact disc C is placed in third magazine position 63 and a fourth compact disc F is placed in fourth magazine position 64. Magazine positions in which a compact disc has been placed are each assigned to one memory location of memory unit 15. The positions are assigned on the basis of an identifier, which is selected as an upper case letter according to the example illustrated in FIG. 1. Thus, first compact disc A is represented by identifier A, second compact disc B is represented by identifier B, third compact disc C is represented by identifier C, and fourth compact disc F is represented by identifier F. The respective identifier is shown in memory location 35–44 assigned to the respective compact disc of corresponding magazine position 61–64. Thus, first compact disc A in first magazine position 61 is assigned to first memory location 35, second compact disc B in second magazine position 62 is assigned to second memory location 36, third compact disc C in third magazine position 63 is assigned to third memory location 37, and fourth compact disc F in fourth magazine position 64 is assigned to sixth memory location 40. It should be pointed out here that the assignment is not made between a magazine position and a memory location but instead between a compact disc placed in a magazine position and a memory location, so that no memory location is assigned to empty magazine positions. On the other hand, the contents of memory locations 35–44 are retained regardless of whether the respective compact disc with the identifier stored in corresponding memory location 35–44 has been placed in magazine 50 or is not in playback apparatus 1.

For access to memory locations 35–44, there are two possibilities, namely, direct access and indirect access. Indirect access to memory locations 35–44 is accomplished by entering a number between 1 and 4 for selecting a magazine position 61–64 on alphanumeric 10-key keypad 70. Depending on the number entered on alphanumeric 10-key keypad 70, one of the four magazine positions 61–64 is addressed by way of input unit 10, which is indicated in FIG. 1 by a first dotted double arrow 85 on the edge of magazine 50. According to FIG. 1, the key bearing the number 4 has been depressed on alphanumeric 10-key keypad 70, so that fourth magazine position 64 with fourth compact disc F is addressed. This fourth compact disc F is then placed in drive 55 and is ready for playback. However, the memory location of memory unit 15 currently being read out by display unit 5 is fourth memory location 38 with the name "ABBA," so the name "ABBA" appears on display 65 of display device 5. However, because of the number entered on alphanumeric 10-key keypad 70, sixth memory location 40 bearing the name "CLASSIC" and assigned to fourth compact disc F in fourth magazine position 64 is read out by display device 5, and this name then appears in display 65.

Figure 4:
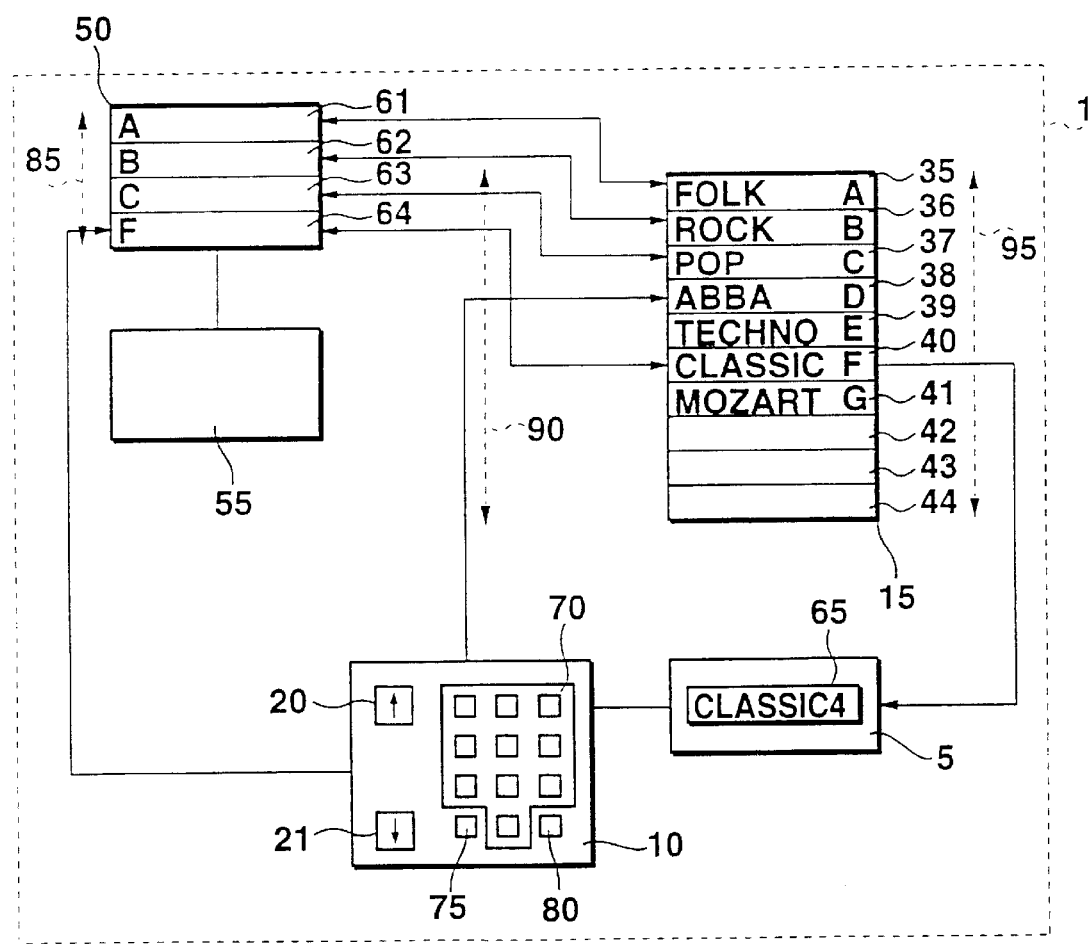
FIG. 4 shows a block diagram of a playback apparatus according to another example embodiment.

FIG. 4 shows the block diagram from FIG. 1, with the same reference numbers characterizing the same elements. In contrast to FIG. 1, display device 5 in FIG. 4 accesses sixth memory location 40 and displays the name "CLAS-SIC" in display 65. This name is also supplemented by numeral 4 on display 65 to indicate to the user that the compact disc assigned to the name shown on display 65 comes from fourth magazine position 64. Since the display on display 65 is steady, i.e., not flashing, the user is also informed that the compact disc assigned to the name displayed on display 65 is currently in drive 55.

Direct access to memory locations 35, . . . , 44 is possible by using two operating elements 20, 21 designed as direction keys, thereby forming a memory access unit. In the embodiment according to FIG. 1 or FIG. 4, fourth memory location 38 is addressed directly by input unit 10. Third memory location 37 is addressed by operating first operating element 20 once; second memory location 36 is addressed by operating operating element 20 twice, and first memory location 35 is addressed by operating first operating element 20 three times. Thus, memory unit 15 is run through from bottom to top by operating first operating element 20. Memory unit 15 is run through from top to bottom accordingly by operating second operating element 21, so that fifth memory location 39 is addressed by a single operation of second operating element 21 starting from the addressing according to FIG. 1 or FIG. 4; sixth memory location 40 is addressed by operating second operating element 21 twice; seventh memory location 41 is addressed by operating second operating element 21 three times; eighth memory location 42 is addressed by operating second operating element 21 four times, and so forth. This variable direct addressing of memory locations 35 of memory unit 15 by input unit 10 is represented by a second dotted double arrow 90 to the left of memory unit 15.

If first operating element 20 is operated once, based on the diagram according to FIG. 4, third memory location 37 is addressed directly by input unit 10, and display device 5 reads out the name stored in third memory location 37, displaying it on display 65. If second operating element 21 is then operated, fourth memory location 38 is addressed directly by input unit 10, and display device 5 reads out the name stored in fourth memory location 38, displaying it on display 65 according to the diagram in FIG. 1. Access of display device 5 to memory locations 35, . . . , 44 is therefore also variable accordingly, which is represented by a third dotted double arrow 95 to the right of memory unit 15 according to FIG. 1 and FIG. 4.

Figure 2:
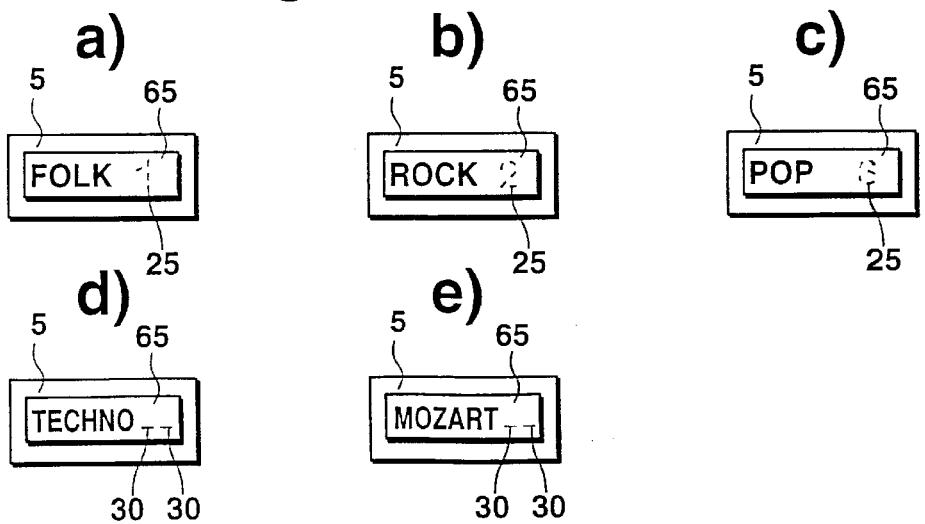
FIG. 2 shows various name displays on a display unit of the example playback apparatus.

If direct access to first memory location 35 takes place by operation of first operating element 20 three times during playback of fourth compact disc F, the name "FOLK" stored there is displayed on display 65 according to FIG. 2a. Since the respective first compact disc A is in first magazine position 61, a numeral 1 is also shown in addition to this name on display 65 and appears as a flashing symbol 25, so that the user is informed that the compact disc belonging to that name has been placed in the first magazine position 61 but is not yet in drive 55. If second operating element 21 is operated once, second memory location 36 is addressed directly by input unit 10 and the name "ROCK" stored there is displayed on display 65. Since the respective compact disc is second compact disc B in second magazine position 62, a numeral 2 is added to the display on display 65, and like numeral 1 in FIG. 2a, it is shown with dotted lines and appears as a flashing symbol 25, thus signaling to the user that the respective compact disc is in second magazine position 62 and is not currently in drive 55. When the second operating element 21 is operated again, third memory location 37 is addressed directly by-input unit 10 and the name "POP" stored there is displayed on display 65 of display device 5 according to FIG. 2c. Respective third compact disc C is in third magazine position 63, so that numeral 3 is added as a flashing character 25 to the name in display 65 and is shown with dotted lines in FIG. 2. This signals to the user that the respective compact disc is in third magazine position 63 and is not currently in drive 55. If second operating element 21 is now operated two additional times, fifth memory location 39 is addressed directly by input unit 10 and the name "TECHNO" stored there appears on display 65. Since no compact disc in magazine 50 is currently assigned to this fifth memory location 39, the name on display 65 is supplemented by two special characters 30 in the form of hyphens. This signals to the user that the compact disc assigned to this name is not currently in magazine 50 nor in drive 55. FIG. 2d shows the corresponding diagram. The same thing is true according to FIG. 2e with further operation of second operating element 21 twice for the name "MOZART" stored in seventh memory location 41, whose respective compact disc is likewise not in playback apparatus 1. Therefore the name "MOZART" is also supplemented by two special characters 30 in the form of hyphens on display 65.

In the embodiment according to FIG. 1 or FIG. 4, only the first seven memory locations 35–41 are occupied, whereas the last three memory locations 42, 43, 44 are not occupied.

A name displayed on display 65 can be revised by using alphanumeric 10-key keypad 70. A revised name is stored in corresponding memory location 35–41 of memory unit 15 by writing over the old name by operating memory key 80. By operating delete key 75, it is also possible to delete the contents of corresponding memory location 35–41 read out by display device 5 and displayed on display 65. In addition, an operating element (not shown in FIG. 1 or in FIG. 4) may also be provided on input unit 10 for deleting the entire contents of memory unit 15 when this element is operated.

The function of deleting all the memory locations to which no compact disc is assigned in magazine 50 can also be implemented by an additional operating element provided on input unit 10. The identifiers of the compact discs placed in magazine positions 61–64 or in drive 55 are compared with the identifiers stored in memory locations 35 and all memory locations 35 whose identifier could not be found in magazine 50 are deleted.

By deleting memory locations 35, 36, 37, 40 assigned to compact discs A, B, C, F, the respective assignment between the corresponding compact disc and the corresponding memory location is also deleted.

Figure 3:
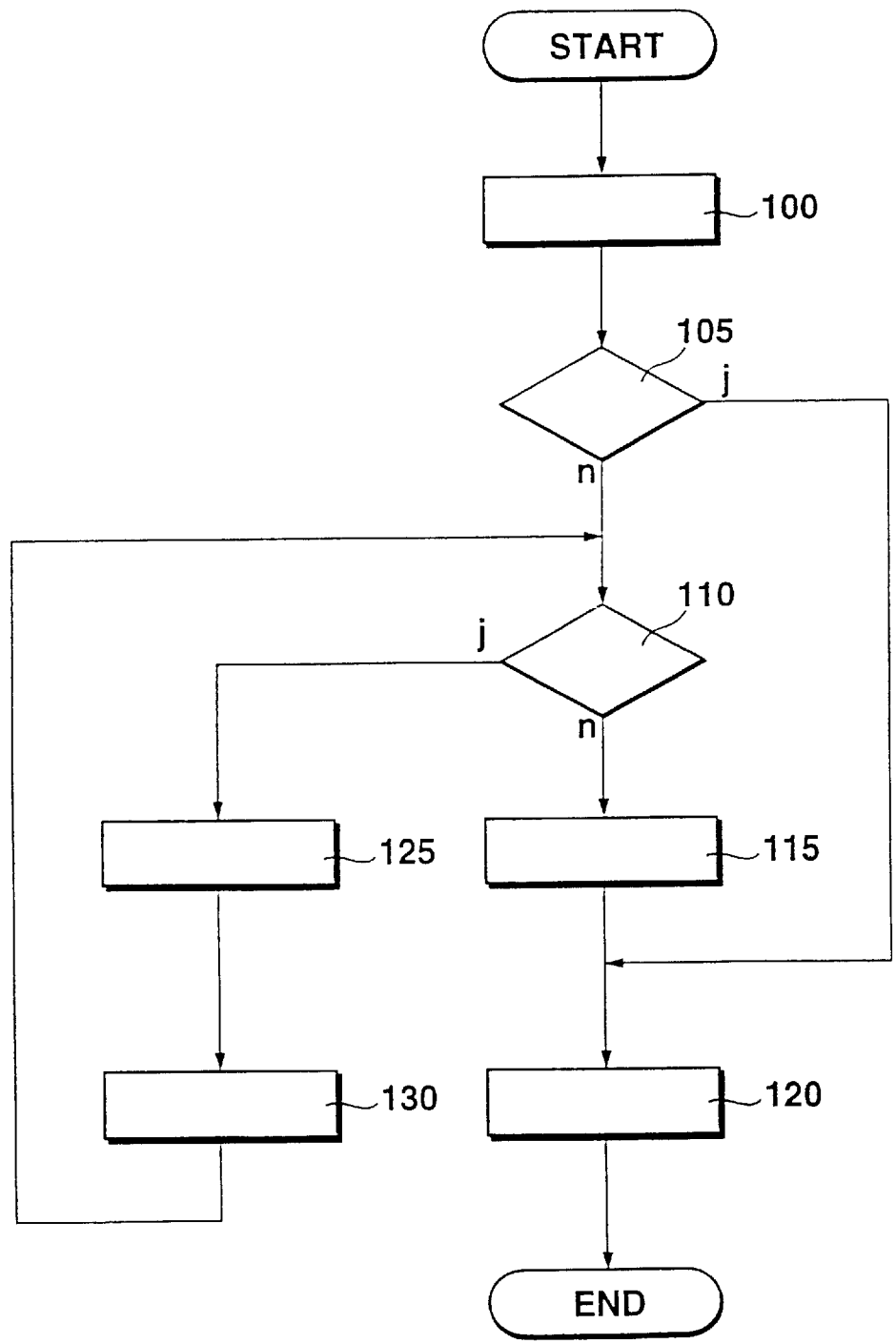
FIG. 3 shows a flow chart for memory allocation when a recording medium is inserted into the playback apparatus, in accordance with the example embodiment of the present invention.

FIG. 3 shows a flow chart for the operation of placing a compact disc in drive 55. At program point 100, a numeral between 1 and 4 is entered on alphanumeric 10-key keypad 70. If there is a compact disc in magazine position 61–64 thus selected, it is loaded into drive 55. At program point 105, a check is performed to determine whether the identifier of this compact disc is stored in one of memory locations 35–44 If this is the case, it branches off to program point 120; otherwise it branches off to program point 110. At program point 110, a check is performed to determine whether memory unit 15 is completely occupied. If this is the case, it branches off to program point 125; otherwise, it branches off to program point 115. At program point 115, a free memory location of memory unit 15 is occupied by the identifier of the compact disc. Then program point 120 is executed. At program point 120, the name stored in the respective memory location is displayed on display device 5 together with the number of magazine position 61, . . . , 64 from which the compact disc was loaded into drive 55. If there is still no name in the corresponding memory location, only the number of the magazine position is displayed. Then it advances to the next program part. The user can then revise a name that is already present or, if no name has yet been issued, the user may name this compact disc for the first time. At program point 125, a display appears on display 65 of display device 5, informing the user that memory unit 15 is full. Then program step 130 is executed. At program step 130, a predetermined waiting time is set during which the user has an opportunity to delete a memory location by direct access to memory unit 15 by both operating elements 20, 21 and delete key 75. Then it branches back to program point 110.

The present invention is not limited to the embodiment described here, but instead it can also be applied to all types of playback apparatuses 1 for recording media, i.e. for all types of compact disc players, cassette or tape players or the like. If there is no magazine 50, drive 55 may also be regarded as a single magazine position, and a recording medium placed in drive 55 may be assigned to a memory location 35–44 of memory unit 15. The number of magazine positions or memory locations selected in the embodiment described here was chosen only as an example and can be adapted accordingly as needed. The signaling on display 65 indicating whether the compact disc belonging to the name displayed is in magazine 50, drive 55 or not in playback apparatus 1 at that moment may also be accomplished by a method other than that described here.

Playback apparatus 1 may also be integrated into a radio receiver, for example a car radio.

Direct access of input unit 10 to memory unit 15 can also be accomplished by way of a bus system. This is advantageous in particular when input unit 10 is physically separated from playback apparatus 1.

What is claimed is:

1. A playback apparatus for recording media, comprising:

a display device;

a memory unit;

an input unit for inputting the names of recording media in memory locations of the memory unit independent of whether the recording media are in the playback apparatus, the memory unit storing the names; and a memory access unit for reading out directly a selected name of the names stored in the memory unit and for displaying the selected name on the display device, each of the memory locations being selectable by the memory access unit.

2. The playback apparatus according to claim 1, wherein the memory unit includes a read-write memory.

3. The playback apparatus according to claim 2, where the selected name displayed on the display device can be revised and stored using the input unit.

4. The playback apparatus according to claim 1, where the selected name displayed on the display device can be deleted using the input unit.

5. The playback apparatus according to claim 1, wherein the names stored in the memory unit are assigned to recording media placed in the playback apparatus.

6. The playback apparatus according to claim 1, wherein the selected name is displayed on the display device as a function of a status of a recording medium assigned to the selected name in the playback apparatus.

7. The playback apparatus according to claim 6, wherein the selected name displayed on the display device is supplemented with a flashing character if the recording medium assigned to the selected name is in the playback apparatus.

8. The playback apparatus according to claim 7, wherein the selected name displayed is supplemented with a non-flashing character if the recording medium assigned to the recording medium is in a drive of the playback apparatus.

9. The playback apparatus according to claim 6, wherein the selected name displayed on the display device is supplemented with at least one special character if the recording medium assigned to the selected name is not in the playback apparatus.

10. The playback apparatus according to claim 1, wherein the memory access unit includes at least one operating element on the input unit, direct selection of the selected name being implemented by operating the at least one operating element.

11. The playback apparatus according to claim 1, further comprising at least one of a compact disk player, a compact disk changer, a cassette player and a tape player.

12. The playback apparatus according to claim 1, further comprising:

a drive playing a selected recording medium of the recording media, wherein the selected name displayed on the display device is not assigned to the selected recording medium playing.

13. The playback apparatus according to claim 12, further comprising:

a magazine storing at least one of the recording media, wherein the selected name displayed is assigned to one of the at least one of the recording media stored in the magazine.

14. The playback apparatus according to claim 12, wherein the selected name displayed is not assigned to any recording media in the playback apparatus.

* * * * *

UNITED STATES PATENT AND TRADEMARK OFFICE
CERTIFICATE OF CORRECTION

PATENT NO. : 6,590,838 B1
DATED : July 8, 2003
INVENTOR(S) : Karl-Heinz Gerlings et al.

It is certified that error appears in the above-identified patent and that said Letters Patent is hereby corrected as shown below:

Column 1,
Line 11, change "is described in from" to -- is described in --

Column 3,
Line 30, change "locations 35" to -- locations 35-44 --
Line 42, change "locations 35,...,44" to -- locations 35-44 --
Line 55, change "If second operating element" to -- If the second operating element --

Column 4,
Line 6, change "If second operating" to -- If the second operating --
Line 28, change "location 35-41" to -- location 35-44 --
Line 31, change "location 35-41" to -- location 35-44 --
Line 43, change "memory locations 35" to -- memory locations 35-44 --
Line 44, change "memory locations 35" to -- memory locations 35-44 --
Line 66, change "positions 61,...,64" to -- positions 61-64 --

Signed and Sealed this

Fifteenth Day of February, 2005

JON W. DUDAS
*Director of the United States Patent and Trademark Office*